United States Patent

[11] 3,608,502

[72] Inventor Hans F. Wegener
 Michigan City, Ind.
[21] Appl. No. 787,016
[22] Filed Dec. 26, 1968
[45] Patented Sept. 28, 1971
[73] Assignee National Steel Corporation

[54] CONTROLLED-FLOATING LADING
 6 Claims, 2 Drawing Figs.
[52] U.S. Cl. .................................................. 105/369 B,
 105/367, 105/369 U
[51] Int. Cl. ..................................................... B60p 7/16,
 B61d 45/00
[50] Field of Search........................................... 105/366,
 369 S, 369 U, 367, 369 B, 369 A; 248/119;
 254/42, 104; 214/84; 280/179

[56] References Cited
 UNITED STATES PATENTS
1,745,055 1/1930 Romine........................ 105/369 U

| | | | |
|---|---|---|---|
| 1,820,729 | 8/1931 | Chalmers...................... | 105/369 S |
| 2,053,638 | 9/1936 | Schroeder..................... | 105/369 S |
| 2,065,650 | 12/1936 | Burke............................ | 105/369 U |
| 2,279,522 | 4/1942 | Price............................. | 105/369 S |
| 2,424,395 | 7/1947 | Hedges.......................... | 105/367 |
| 2,567,465 | 9/1951 | Barbour........................ | 105/369 S |

Primary Examiner—Drayton E. Hoffman
Attorney—Shanley and O'Neil

ABSTRACT: Controlled-floating lading arrangement in which a wedge system blocks heavy lading against upstanding support surfaces in a freight conveyance. Shifting of the lading incident to quick stops or starts of the conveyance, which would snap rigid moorings, is permitted, but controlled within safe limits by friction between lading and wedges. The wedge system is adjustable for conveyances or loads of different sizes, and is reusable.

INVENTOR
HANS F. WEGENER

BY
Shanley & O'Neil

ATTORNEYS

CONTROLLED-FLOATING LADING

BACKGROUND OF THE INVENTION

Heavy loads, e.g. steel coils or sheet stacks, present difficult shipping problems. Such loads cannot be left free to shift indiscriminately in a freight conveyance, but the large masses of the loads generate large inertial forces which snap conventional rigid moorings upon quick stops or starts of the conveyance.

As a solution to the problem, controlled-floating lading arrangements have been adopted. Such arrangements employ no rigid moorings; rather, the loads are permitted limited shifting movement along the direction of movement of the conveyance upon abrupt stops or starts of the conveyance. Such shifting movement is controlled within safe limits by freight-blocking systems which employ friction forces to restrain the lading.

Blocking arrangements devised heretofore are unsatisfactory. The arrangements are constructed in the conveyance from individual lengths of lumber, which requires precise cutting and fitting of many individual blocking members. Hence, construction is difficult, time-consuming, and expensive. Further, such arrangements are individually constructed for a particular load in a particular car and disassembled at the shipping destination, and thus are used only for 1 shipment.

A main object of the invention is provision of improved controlled-floating lading arrangements which are quickly, easily and inexpensively constructed, and which employ reusable blocking structure.

Other objects of the invention will appear from the following detailed description which, in conjunction with the accompanying drawings, discloses a preferred embodiment of the invention for purposes of illustration only and not for determination of the limits of the invention. For definition of the scope of the invention, reference will be made to the appended claims.

BRIEF DESCRIPTION OF THE DRAWINGS

In the drawings, where similar reference characters denote similar elements throughout the views.

DESCRIPTION OF THE PREFERRED EMBODIMENT

Figure 1:
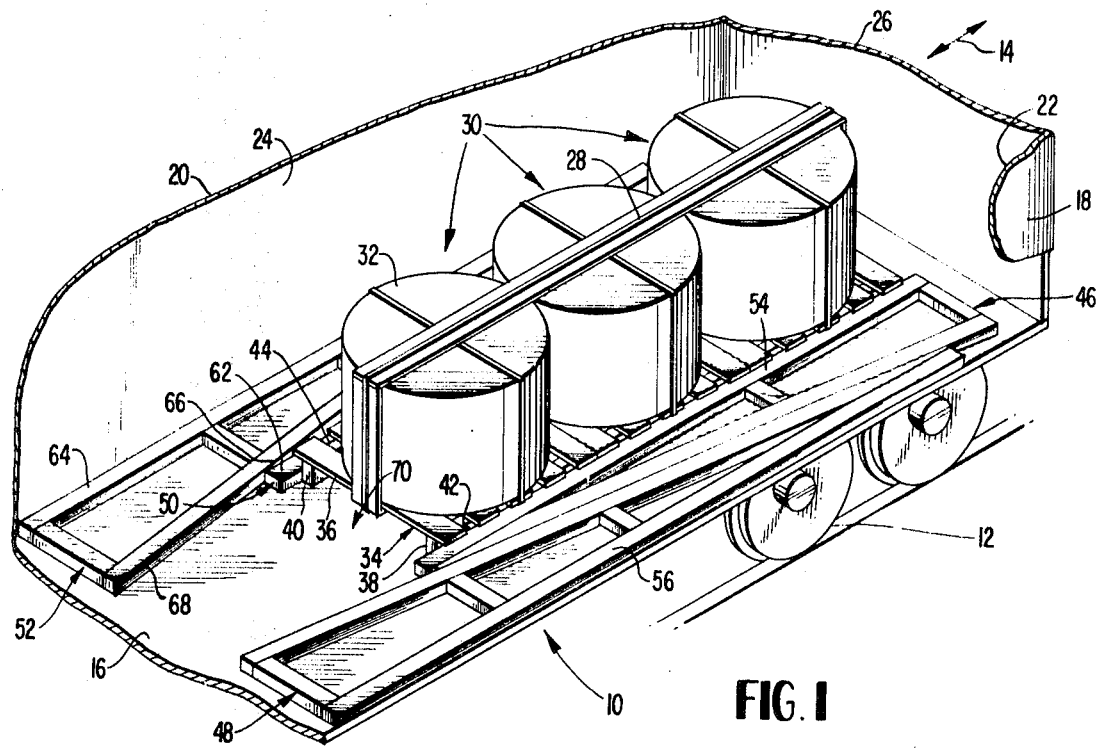
FIG. 1 depicts a controlled-floating lading arrangement made in accordance with principles of the invention.

In FIG. 1, a freight-carrying body in the form of a railway boxcar is generally indicated at 10. Car 10 includes wheels 12 which mount the car for forward or rearward movement in a direction along its longitudinal axis, as indicated by arrow 14.

Car 10 has a planar floor 16, and spaced-apart, upstanding sidewalls 18, 20 extending along the direction of movement of the car. Sidewalls 18, 20 respectively include interior surfaces 22, 24, which form support surfaces against which lading is blocked. Car 10 includes upstanding, opposite end walls, one of which is illustrated at 26. Three lading units generally indicated at 30 are mounted on floor 16 between opposing sidewalls 18, 20, and are joined together by a steel strap 28. The lading units are free of rigid attachment to the car, and can shift relative to the car by sliding over floor 16 along the direction of car movement upon abrupt acceleration or deceleration of the car. The lading units are identical, so description of one will impart understanding of all.

Figure 2:
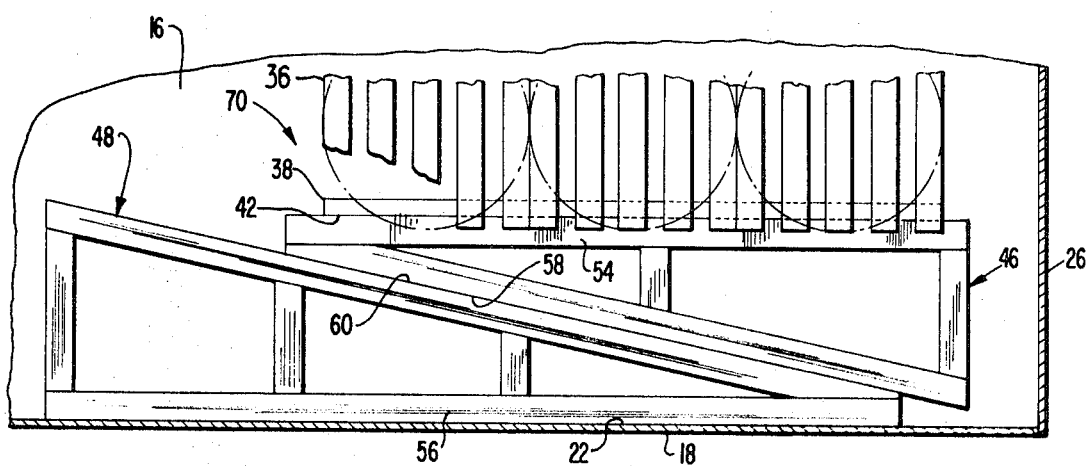
FIG. 2 is a fragmentary plan view of the arrangement of FIG. 1.

Each lading unit includes a steel coil 32 banded to a pallet generally indicated at 34. Pallet 34 includes a load-carrying platform 36 and a pair of upstanding, elongated legs or battens 38, 40 (see also FIG. 2). The legs are secured to platform 36, and support the platform and coil on car floor 16 for sliding movement over the floor. Legs 38, 40 respectively include opposite outside surfaces 42, 44 which extend along the direction of movement of the car. Each side surface on the pallet legs facially opposes and is spaced across floor 16 from a support surface of a car sidewall. Support surfaces 22, 24, and side surfaces 42, 44 are all generally parallel to one another.

The lading arrangement illustrated includes a wedging system which blocks, i.e., braces or supports, the side surfaces of the pallet legs against the support surfaces of the car sidewalls. This is effected with generally horizontally directed wedging forces of magnitudes to develop sufficient friction forces to slow and stop the shifting movement of the lading units along the direction of movement of the car caused by abrupt acceleration or deceleration of the car. The wedging system includes four wedge members, which are generally indicated at 46, 48, 50, 52 respectively, and are arranged in cooperating pairs on each side of the lading. The wedges are made of lumber, and are of similar construction. Each wedge is a hollow, right-triangular frame having a short side, a long side, a hypotenuse side, and one or more reinforcing members parallel to the short side and spaced along the long side. Wedges 46, 50 are identical to one another, and slightly shorter than mutually identical wedges 48, 52.

Cooperating wedges 46, 48 are located between pallet side surface 42 and sidewall support surface 22. Wedge 46 includes a side portion 54 generally parallel to and in tight frictional engagement with contiguous upstanding side surface 42 on pallet leg 38. Wedge 48 has a side portion 56 generally parallel and in tight frictional engagement with contiguous support surface 22. Wedges 46, 48 have parallel, opposed, upstanding wedge surfaces 58, 60 respectively in tight frictional engagement with each other. Wedge surfaces 58, 60 incline at acute angles relative to side portions 54, 56 respectively in a direction from one of surfaces 22, 42 to the other. The wedge surfaces cooperate with one another to apply wedging forces against side and support surfaces to brace the lading against the support surface.

Wedges 50, 52 are disposed between pallet side surface 44 and sidewall support surface 24. Wedge 50 has a side portion 62 contiguous and generally parallel to upstanding side surface 44, and wedge 52 has a side portion 64 contiguous and generally parallel to support surface 24. Wedges 50, 52 have opposed, upstanding, mutually engaging wedge surfaces 66, 68 respectively. Wedges 50, 52 form a cooperating pair arranged and acting with respect to one another and to pallet side surface 44 and wall support surface 24 in a manner similar to the arrangement and action of wedges 46, 48 relative to side and support surfaces 42, 22.

All wedges are disposed on floor 16 in generally coplanar relationship with one another, and lie in a plane generally parallel to the floor. The wedges are rigidly secured in position on the floor by nails passing through the wedge frame members into the car flooring.

In use, a quick stop or start of the car initiates shifting movement of the lading in a guideway or slideway which is generally indicated at 70 and is defined by wedge side portions 54, 62 and that portion or surface of floor 16 which is between side portions 54, 62. It will be appreciated that the lading may shift either forwardly or rearwardly along the direction of car movement, depending on the action of the car. For example, if the car is moving to the right as viewed in the drawings and abruptly decelerates or stops, the lading will shift to the right. However, if the car is at rest or moving slowly to the right and abruptly starts or accelerates to the right, the lading will shift to the left relative to the car.

In any event, the shifting movement is restricted within guideway 70 by presence of the wedges, and is slowed and finally stopped by friction forces applied to the pallet by the wedges. It will be appreciated that such friction forces are in addition to the friction forces applied to the pallet by the floor, which latter alone are not sufficient to stop load shifting. Jamming the wedges tightly against the pallet on installation of the wedges effects the result of stopping the shifting movement.

The lading arrangement illustrated can be constructed by depositing the lading units on the car floor in the position shown. The wedges are then disposed generally in the locations illustrated. At least one wedge of each pair is adjusted by sliding it along the floor along the direction of movement of the car to engage the wedge surfaces of the cooperating pair and apply wedging forces in a generally horizontal direction transverse to the direction of car movement against the pallet legs and the sidewalls to jam the wedges tightly between the sidewalls and the pallet legs to force the wedges into tight frictional engagement with the pallet legs. The wedges are then nailed in position.

Controlled-floating lading arrangements according to the invention are highly advantageous. They can be constructed quickly, inexpensively, and easily without necessity for cutting and fitting many individual lengths of lumber. The wedge-blocking system can be reused, and is adjustable to accommodate loads having varying distances between sidewalls and pallets merely by adjusting the positions of the wedges of a pair relative to one another longitudinally in the car to slide the wedge surfaces over one another and thus vary the distance between the parallel side portions of the wedge pair. Although the invention has been described in connection with a preferred embodiment, modifications of the embodiment illustrated can be made without departing from the principles of the invention. Such modifications are within the scope of the appended claims.

I claim:

1. Controlled-floating lading structure, comprising
a freight-carrying body including a floor,
transporting means mounting the body for movement along a direction,
the body including means defining spaced-apart upstanding support surfaces extending along the direction of movement of the body,
at least one lading unit mounted on the body for shifting movement along the direction of movement of the body upon abrupt acceleration and deceleration of the body,
the lading unit being located between the support surfaces and including means defining upstanding opposite side extending along the direction of movement of the body,
each side surface opposing a support surface, and
wedging means for stopping the shifting movement of the lading unit,
the wedge means including a plurality of wedge members blocking the side surfaces of the lading unit against the support surfaces of the body,
the wedge members having cooperating wedge surface means for applying wedging forces against the side surfaces of the lading unit transversely to the direction of shifting movement to establish friction forces restraining the shifting movement of the lading unit,
each wedge member extending along the direction of movement of the body at least a distance corresponding generally to the length of the lading unit,
the wedge members being in generally coplanar relationship with one another and lying in a plane generally parallel to the floor of the body,
at least 1 of the wedge members defining at least a portion of a guideway for the shifting movement of the lading unit.

2. The structure of claim 1. each wedge member comprising a hollow frame.

3. The structure of claim 1., the lading unit including a pallet having leg members, and
the side surfaces being on the leg members.

4. The structure of claim 1,
the side surfaces including a first side surface and the support surfaces including a first support surface,
the first side surface being spaced from the first support surface,
the plurality of wedge members including a pair of wedge members disposed between the first side surface and the first support surface,
the pair of wedge members including a first wedge member and a second wedge member,
The first wedge member having a side portion contiguous and generally parallel to the first side surface,
the second wedge member having a side portion contiguous and generally parallel to the first support surface,
the wedge members having cooperating wedge surfaces opposing one another,
the side portion of the first wedge member defining at least a portion of one side of the guideway,
the body including a freight-carrying surface defining a bottom portion of the guideway, and
the lading unit being slidably mounted on the freight-carrying surface.

5. The structure of claim 4,
the side surfaces including a second side surface and the support surfaces including a second support surface,
the second side surface being spaced from the second support surface,
the plurality of wedge members including a second pair of wedge members,
the second pair of wedge members including a third wedge member and a fourth wedge member,
the second pair of wedge members being disposed between the second side surface and the second support surface,
the third wedge member having a side portion contiguous and generally parallel to the second side surface,
the fourth wedge member having a side portion contiguous and generally parallel to the second support surface, and
the third and fourth wedge members having cooperating wedge surfaces opposing one another,
the side portion of the third wedge member defining at least a portion of a second side of the guideway,
the second side of the guideway being opposite the first side of the guideway.

6. The structure of claim 5,
the floor of the body having an upper surface forming the freight-carrying surface.

PO-1050
(5/69)

UNITED STATES PATENT OFFICE
CERTIFICATE OF CORRECTION

Patent No. 3,608,502            Dated September 28, 1971

Inventor(s) Hans F. Wegener

It is certified that error appears in the above-identified patent and that said Letters Patent are hereby corrected as shown below:

Column 1, line 27 "1" should be --one--;
        line 59, the word "Three" should start a new paragraph.

Column 2, line 34, after "against" (first occurrence), insert --the--.

Column 3, line 21, the word "Although" should start a new paragraph;
        line 38, after "side" insert --surfaces--;
        line 44, "wedge" should be --wedging--.

Column 4, line 2, "1" should be --one--;
        line 20, "The" should be --the--.

Signed and sealed this 9th day of May 1972.

(SEAL)
Attest:

EDWARD M. FLETCHER, JR.
Attesting Officer

ROBERT GOTTSCHALK
Commissioner of Patents